Figure 1:
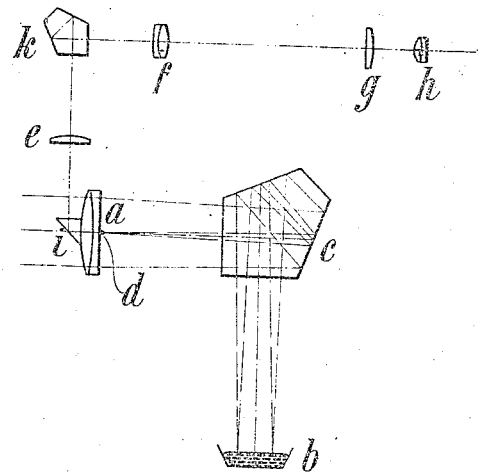

H. WILD.
TELESCOPE LEVEL.
APPLICATION FILED SEPT. 22, 1908.

921,773.

Patented May 18, 1909.

Witnesses:
Paul Krüger
Fritz Sander

Inventor:
Heinrich Wild

UNITED STATES PATENT OFFICE.

HEINRICH WILD, OF JENA, GERMANY, ASSIGNOR TO THE FIRM OF CARL ZEISS, OF JENA, GERMANY.

TELESCOPE-LEVEL.

No. 921,773.

Specification of Letters Patent.

Patented May 18, 1909.

Application filed September 22, 1908. Serial No. 454,167.

*To all whom it may concern:*

Be it known that I, HEINRICH WILD, a citizen of the German Empire, and residing at Carl-Zeiss strasse, Jena, in the Grand Duchy of Saxe-Weimar, Germany, have invented a new and useful Telescope-Level, of which the following is a specification.

The invention consists in a leveling instrument, the sighting telescope of which contains among its constituent parts a catoptric plummet formed either by a vertical mirror or by a horizontal mirror together with an optical square.

The terms "vertical mirror" and "horizontal mirror" should be understood to include, in addition to solid plane mirrors which are suspended so as to secure their vertical or horizontal position, such solid plane mirrors which are connected with a level so that according to the indication of the latter they can be adjusted vertically or, at least in one direction, horizontally, and a "horizontal mirror" may also consist of a reflecting fluid arranged to present a free surface.

In the French specification 370,626 a leveling instrument is shown and described, in which a sighting telescope, a horizontal mirror and an optical square prism are combined in such a manner, that the prism is situated immediately in front of the left or right half of the objective and at the same time above the horizontal mirror. The distance of the mirror from the objective is optional. Through this arrangement autocollimation is produced, in that the objective with the assistance of the horizontal mirror projects a real image from the sighting mark situated in its hinder focal plane into the same plane.

The difference between this well known instrument and the instrument constructed according to the present invention is not merely a difference in the arrangement and the coöperation of the three main parts: sighting telescope, horizontal mirror and optical square prism. On the contrary the mirror, which may be suitably considered in the first place as a vertical mirror, is an essential constituent part of the sighting telescope, in as much as it transfers the real image of the object projected by the objective into the field of the sighting mark. The sighting mark, however, is in the present case arranged on or near the objective and on or near its axis. The mirror must therefore be situated on the side of the objective remote from the object, and the optical distance between the two must be about half the focal length of the objective. Since the observer may not encroach upon the space between the objective and the object, a broken ocular must be employed.

In the arrangement just described the telescope is serviceable for all distances within the range of such instruments, furthermore it does not require a fine adjustment, in as much as the axis of the objective can be somewhat inclined in the vertical sighting plane relatively to the beam of rays proceeding from the object point in the horizontal plane, without the image point produced by the beam falling outside the sighting mark. This is strictly the case, when the sighting mark is situated in the optical center of the objective, and with sufficient approximation, when the mark lies near this point.

If the vertical mirror be substituted by a horizontal mirror and an optical square prism, it is not imperative, that the optical square prism lie between the objective and the horizontal mirror. On the contrary a specially suitable arrangement is obtained, when the objective is arranged immediately above the horizontal mirror and with its axis vertical, the prism, however, above the objective, that is, between the objective and the object.

Figure 2:
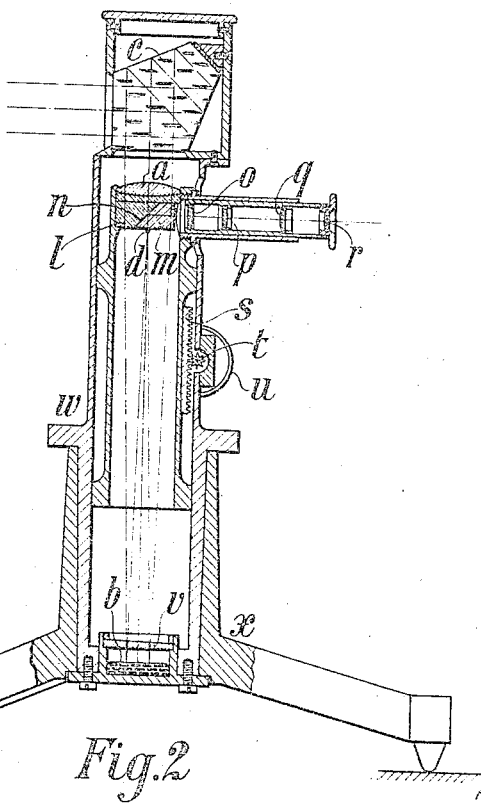

In the annexed drawing: Figure 1 is a diagrammatic view of the optical parts of a telescope level constructed according to the invention. Fig. 2 is a sectional elevation of another level constructed according to the invention.

In both examples a horizontal mirror and an optical square prism are made use of. In Fig. 1, between the objective $a$ and the horizontal mirror $b$, the optical square prism $c$ is arranged which is the immediate result of substituting the above supposed vertical mirror by a horizontal mirror and an optical square prism. The prism $c$ deflecting exactly 90°, the real image of the object point in the horizontal plane is consequently projected into the axis of the objective $a$, where the sighting mark $d$ is also arranged. An ocular broken twice permits observation being performed with the observer facing the object. In this ocular, with the lenses $e$, $f$, $g$ and $h$ of an ordinary terrestrial ocular two prisms $i$ and $k$ are combined, of which $i$ is cemented on the objective and presents a simple reflection which, in combination with the reflection through $b$, nullifies the erection of the image caused by the reversed position of the observer, while to maintain the erection of the image caused by the ocular lenses, the prism $k$ is constructed as an optical square prism.

In the instrument according to Fig. 2 the optical square prism $c$ receives the rays coming from the object and transmits them to the objective $a$, which is arranged with vertical axis above the mercury mirror $b$. On the under surface of the objective a two-part plano-parallel plate $m$ is cemented, which on the one hand forms the carrier for the linear sighting mark $d$ which intersects the axis of the objective, and on the other carries in its inclined juncture a silver layer $n$, which forms the entrance mirror of the ocular simply broken by this device. The ocular lenses $o, p, q$ and $r$ represent in this case also an ordinary terrestrial ocular, so that the observer views an erected image. In order to enable the image of the object to be brought exactly into the field of the sighting mark, the objective together with the ocular is made adjustable in height by the rack and pinion $s\ t\ u$. The glass cover $v$ of the mercury chamber is a wedge-formed disk. By rotating this wedge a possible deviation of the angle of deflection of the optical square prism $c$ from 90° can be compensated for as well as an extra-axial position of the sighting mark in such a manner, that the image of the object point in the horizontal plane nevertheless falls in the sighting mark $d$. For the azimuthal rotation of the instrument its main casing $w$ is pivoted on a tripod $x$.

I claim:

1. In a telescope level a sighting telescope consisting of an objective, a catoptric plummet, a sighting mark in proximity to the objective and a broken ocular.

2. In a telescope level a sighting telescope consisting of an objective, an optical square, a horizontal mirror, a sighting mark in proximity to the objective and a broken ocular, the mirror lying on the side of the objective remote from the object and the optical distance between the objective and the horizontal mirror being about half the focal length of the objective.

3. In a telescope level a sighting telescope consisting of an objective, the axis of which is vertical, an optical square above the objective, a horizontal mirror below the objective at a distance from it about equal to half its focal length, a sighting mark in proximity to the objective and a broken ocular.

HEINRICH WILD

Witnesses:
PAUL KRÜGER,
FRITZ SANDER.